(12) United States Patent
Choudhury et al.

(10) Patent No.: US 10,855,706 B2
(45) Date of Patent: Dec. 1, 2020

(54) SYSTEM AND METHODS FOR AUTOMATED DETECTION, REASONING AND RECOMMENDATIONS FOR RESILIENT CYBER SYSTEMS

(71) Applicant: BATTELLE MEMORIAL INSTITUTE, Richland, WA (US)

(72) Inventors: Sutanay Choudhury, Kennewick, WA (US); Khushbu Agarwal, Kennewick, WA (US); Pin-Yu Chen, Yorktown Heights, NY (US); Indrajit Ray, Fort Collins, CO (US)

(73) Assignee: Battelle Memorial Institute, Richland, WA (US)

( * ) Notice: Subject to any disclaimer, the term of this patent is extended or adjusted under 35 U.S.C. 154(b) by 71 days.

(21) Appl. No.: 15/730,028

(22) Filed: Oct. 11, 2017

(65) Prior Publication Data

US 2018/0103052 A1    Apr. 12, 2018

Related U.S. Application Data

(60) Provisional application No. 62/406,699, filed on Oct. 11, 2016.

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06N 3/04* | (2006.01) | |
| *G06N 3/08* | (2006.01) | |
| *G06F 16/901* | (2019.01) | |
| *G06F 21/56* | (2013.01) | |
| *G06N 5/02* | (2006.01) | |

(52) U.S. Cl.
CPC ...... *H04L 63/1425* (2013.01); *G06F 16/9024* (2019.01); *G06F 21/566* (2013.01); *G06N 3/0427* (2013.01); *G06N 3/0445* (2013.01); *G06N 3/08* (2013.01); *G06N 5/022* (2013.01); *H04L 63/1416* (2013.01); *H04L 63/20* (2013.01); *H04L 63/1441* (2013.01)

(58) Field of Classification Search
CPC ... H04L 63/425; H04L 63/1416; H04L 63/20; H04L 63/1441; H04L 63/1433; G06F 16/9024; G06F 21/1566
See application file for complete search history.

(56) References Cited

U.S. PATENT DOCUMENTS

| | | | |
|---|---|---|---|
| 9,158,847 B1 * | 10/2015 | Majumdar | G06F 16/951 |
| 9,516,053 B1 * | 12/2016 | Muddu | G06F 16/254 |
| 10,110,617 B2 * | 10/2018 | Muddu | G06N 5/022 |
| 2014/0013303 A1 * | 1/2014 | Spitzer | G06F 9/44505 |
| | | | 717/121 |

(Continued)

*Primary Examiner* — Fatoumata Traore
*Assistant Examiner* — Kevin Ayala
(74) *Attorney, Agent, or Firm* — Colby Nipper PLLC

(57) ABSTRACT

A method for securing an IT (information technology) system using a set of methods for knowledge extraction, event detection, risk estimation and explanation for ranking cyber-alerts which includes a method to explain the relationship (or an attack pathway) from an entity (user or host) and an event context to another entity (a high-value resource) and an event context (attack or service failure).

20 Claims, 14 Drawing Sheets

(56) References Cited

U.S. PATENT DOCUMENTS

| | | | | |
|---|---|---|---|---|
| 2014/0188895 A1* | 7/2014 | Wang | ................... | G06F 16/335 |
| | | | | 707/748 |
| 2015/0304349 A1* | 10/2015 | Bernstein | ............ | H04L 63/1425 |
| | | | | 726/22 |
| 2015/0310862 A1* | 10/2015 | Dauphin | ............ | G10L 15/1815 |
| | | | | 704/257 |
| 2015/0341379 A1* | 11/2015 | Lefebvre | ............ | H04L 63/1425 |
| | | | | 726/22 |
| 2016/0065594 A1* | 3/2016 | Srivastava | .......... | H04L 63/1433 |
| | | | | 726/23 |
| 2016/0147585 A1* | 5/2016 | Konig | ................ | G06F 11/3419 |
| | | | | 714/37 |
| 2016/0189193 A1* | 6/2016 | Toumayan | ......... | G06Q 30/0225 |
| | | | | 705/14.26 |
| 2016/0299938 A1* | 10/2016 | Malhotra | ............ | G06F 16/2237 |
| 2017/0116517 A1* | 4/2017 | Chee | ....................... | G05B 15/02 |
| 2017/0126712 A1* | 5/2017 | Crabtree | ............ | H04L 63/1425 |
| 2017/0289187 A1* | 10/2017 | Noel | ................... | H04L 63/1433 |
| 2017/0364534 A1* | 12/2017 | Zhang | .................. | G06F 16/182 |
| 2018/0048661 A1* | 2/2018 | Bird | .................... | H04L 63/1416 |

* cited by examiner

SYSTEM AND METHODS FOR AUTOMATED DETECTION, REASONING AND RECOMMENDATIONS FOR RESILIENT CYBER SYSTEMS

CLAIM TO PRIORITY

This application claims priority to and incorporates by reference in its entirety U.S. Patent Application No. 62/406,699 filed by the same applicant on 11 Oct. 2016.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

Cyber security is one of the most critical problems of our time. Notwithstanding enormous strides that researchers and practitioners have made in modeling and analyzing network traffic, attackers find newer and more effective methods for launching attacks, which means defenders must revisit the problem with a new perspective. While it is acknowledged that not all attacks can be detected and prevented, a system should be able to continue operating in the face of such an attack and provide its core services or missions even in a degraded manner. To build such a resilient system, it is important to be proactive in detecting and reasoning about emerging threats in an enterprise network and their potential effects on the organization, and then identify optimal actions to best defend against these risks.

To help in understanding the problem an example scenario is provided. Assume that a cyber analyst is tasked to protect an information technology infrastructure of a financial institution or a university. The list of resources to protect includes databases containing sensitive data such as payroll or personally identifiable information, and other critical services, such as email, Internet access, or business systems. The goal of the analyst is to maximize the availability of these network resources while protecting the system integrity from malicious attacks. A typical system has hundreds of thousands of devices or workstations that connect to the infrastructure daily. We also have a similar number of users who employ one or more devices to connect to multiple network resources and perform tasks. Hence a need exists in such an environment to continuously monitor the vast amount of data flowing through the network, detect and reason potential problems, and prioritize about how and where to respond. The present disclosure provides a series of advancements toward addressing these needs.

Additional advantages and novel features of the present disclosure will be set forth as follows and will be readily apparent from the descriptions and demonstrations set forth herein. Accordingly, the following descriptions of should be seen as illustrative of the invention and not as limiting in any way.

SUMMARY

The present disclosure provides descriptions of systems and methods for securing an IT (information technology) system using a set of techniques for accomplishing tasks related to 1) knowledge extraction, 2) event detection, 3) estimation and ranking for cyber-alerts, and 4) risk estimation and recommendation. In some embodiments, these methods for performing knowledge extraction include modeling a set of specifications to build a knowledge graph using a data-driven approach to capture behavioral information of each entity. The event detection portion can be accomplished by methods that include augmenting knowledge graph with information in the data stream to detect an abstract "abstract event" or a "kill-chain event.". Explanation and ranking techniques include explaining the relationship (or an attack pathway) from an entity (user or host) and an event context to another entity (a high-value resource) and an event context (attack or service failure). Risk estimation and Recommendation methodologies estimate risk or interestingness measures to rank "alerts" on an entity by studying the behavior within the knowledge graph.

KNOWLEDGE EXTRACTION: In one arrangement modeling the data streams from multiple cyber data sources as a property graph constitutes a basic step in the process. An information technology infrastructure collects multiple types of data such as network traffic (also referred to as netflow), and event logs. The network traffic data stream provides information about the communication between machines, while the event logs provides information about user-level activities through events reported by operating system software or other applications such as a word processor or web browsing software. We describe a set of methods to transform these multiple data sources into a single, unified representation referred to hereafter as a cyber knowledge graph or a knowledge graph. In some examples the cyber knowledge graph is an instance of a property graph concept, which is a variant of a semantic graph concept. A semantic graph is a data structure that captures the interaction or connection (often referred as an edge) between a set of entities (or nodes). An example of a semantic graph is representation of a social network that captures friendship or professional relationships between a set of people. Property-Property graphs are a specialization of semantic graphs, where each of the nodes and edges can capture additional attributes or details in the form of arbitrary sets of key-value pairs. In one of the embodiments the cyber knowledge graph is a semantic graph model capturing the association between three types of entities: users, machines and applications and their properties. This method and proposed representation is agnostic to the applications or software platforms that generate the network traffic or event logs datasets that model the behavior and form the basis for the tripartite cyber knowledge graph. Such a representation supports heterogeneous computing environments observed in most internally managed or cloud-based information technology infrastructures.

In this exemplary embodiment the nodes in the cyber knowledge graph represent software systems such as a workstation or virtual machine (subsequently referred to as machine) and capture the vulnerability of these systems as an attribute. Likewise the edges in this graph represent, for example, the following relationships: user-machine edges capture access control configurations that describe which user has access to a specific workstation or mobile device. Attributes of this edge indicate whether the user has administrative access to the relevant resource. Similarly, communication between two networked software entities (such as a workstation or a virtual machine) can be represented as edges between nodes representing machines and applications.

EVENT DETECTION: One set of methods that operate on this cyber knowledge graph model detect behavioral anomalies around real-word entities represented by graph nodes, map the anomalous behavior and recommend alterations to the cyber infrastructure configuration to improve its robustness. As an example of the resulting capability provided by the implementation of these methods an organization will be able to a) detect when a user (who is a potential insider threat) connects to multiple network services that are inconsistent with his profile, b) evaluate risk and explain why detected activity should be investigated by a human expert and, c) recommend altering network security configurations such as restricting user's access to specific resources or applications to minimize the risk to the larger infrastructure. Today, none of the state-of-the-art systems provide an end-to-end analytics and decision support capability outlined as above.

In one embodiment an event detection component that is robust to varying contexts or scenarios that emerge around an entity of interest, where the entity can be a user or a device represented as a node in the cyber knowledge graph. The state of the art anomaly detection systems typically focuses anomaly detection to a single data stream, such as either network traffic or event logs. On the contrary, our developed method first unifies multiple data sources into a unified property graph representation.

In the described embodiment, anomalies can appear through the formation of different subgraph structures. Our primary contribution is a neural network based method that detects anomalies by analyzing the changes in the Cyber Knowledge Graph at multiple scales. It first monitors subgraph changes at a fine grained resolution in a very specific context. Next, potential changes detected in such specific, fine grained resolution are propagated upwards to a broader context and a decision is emitted when multiple signals in the broader context suggest a definitive shift in behavior. We build a multi-scale graph model from the original property graph, and then train Long-Short Term Memory (LSTM) Neural Network to process information at each scale and emit a decision.

In one context the event detection approach functions similarly to the process of human reading. As humans read through a long news or research article, we read a single sentence at a time, while understanding of each sentence is accomplished through reading the words which make up the sentence. Our reading and interpretation of the content is robust to the order and selection of words, as the same topic can be described using a different combination of words, an obviously in different order. Also, starting from the word level, we constantly aggregate information to a higher level of context. Thus as we process a stream of words and sentences, we are able to draw multiple conclusions while being robust to extreme variation in input. Our method for detecting events in the graph model functions similarly. We treat individual communications between a pair of machines, or an event such as a user starting a web browser like words, the session in which such interactions or events occur like sentences. Therefore, detecting a large-scale event such as a new pattern of behavior for a user or a network device is similar to the process of extracting meaning from sentences in a document.

We extract a multi-scale graph model from the original cyber knowledge graph to represent such hierarchical structure for aggregation of information, from high-resolution, narrower context to coarser-resolution, broader context. For example, we may first aggregate information such as all machine-to-machine communication for a given IP address, and then aggregate activities (discovered from the communication sequence) across multiple workstations or devices to infer behavioral signatures for a single user account, which can be further aggregated to infer group-level behavior of users or machines within an organization. Detailed examples of such hierarchical aggregation from the cyber knowledge graph are described hereafter.

As described earlier, we train a LSTM Neural Network model to detect important behavioral shifts at each layer of the multi-scale graph model. Graphs are discrete data structures, whereas neural networks operate on continuous, differentiable variables. Therefore, we first transform the graph models at each scale to a continuous valued representation in high-dimensional vector space. Effectively, the graph model is transformed into a tabular representation where the features learnt on every node preserve the topological properties associated with its neighborhood. Typically, each node in the graph model becomes a point in 50, 100 or 200-dimensional vector space.

LSTMs are a specialization of Recurrent Neural Networks (RNN), which has the form of a chain of repeating neural network modules. The RNNs have emerged as the preferred neural network architecture for data that is modeled as a sequence. In the context of the Cyber Knowledge Graph, a sequence can represent all communication records associated with a given machine, or the sequence of activities (that are learnt from the communication records) associated with a user account on multiple workstations. Given a sequence, predicting the next element is often a frequent task for sequence-based data such as a stream of events occurring on a workstation. Sometimes, we can accurately predict an event that will occur on a workstation just based on the previous event. But in many cases, accurate prediction requires preserving a longer context or history. LSTMs are a variant of RNNs that are specially designed to track longer-term dependencies.

However, as we remember a longer history and seek to predict a specific class of anomaly, it is important to identify which subset of machine-to-machine communications or events on a specific machine has a larger impact on the anomaly. We do not want to put equal emphasis on everything that is held in the history or the model's memory. Also known as Attention Mechanism, we account for such variable influence via training another layer of a Neural Network for each of the LSTM models involved in the overall Neural Network architecture.

REASONING AND EXPLAINING RISK: While detection of an anomalous behavior is an important first step, automated verification and articulation of its criticality is also important. Any large information technology infrastructure generates a large number of anomalous event signals every day. Typically, such number overwhelms the ability of the human workforce to respond to each of them in a timely fashion. Also, even when a human expert responds to an alert, the first step is to reverse engineer the cause of the anomaly, followed by looking ahead and determining the criticality of the event. Given the current system state and an event, the criticality of the event is typically determined by looking for a high-probability sequence of potential future events that can lead to compromise of critical resources in the infrastructure. Our second embodiment is aimed at discovering a chain of potential events connecting the current system state to a future "breached" system state where an adversary has ownership of critical resources in the infrastructure. The human expert may not be notified if such "event sequence" or "attack pathways" are low-probability. We refer to this entire reasoning process involving identification of event sequences to a system breach and ascertaining its likelihood as an "Explanation Task".

An explanation task may be executed following any anomalous event. If a high-probability "attack pathway" is found, it will be presented to the human expert as an "explanation" for him to investigate the anomaly. Before proceeding further, it needs to be recognized that such reasoning happens over an information representation that is much abstract than raw events (such as a user opening a web browser or a mobile device communicating with a server). Therefore, we introduce "event nodes" in the Cyber Knowledge Graph, and seek to find potential sequences (or paths) of event nodes in Knowledge Graph while leveraging other contextual information available in the graph.

Finding paths in a graph structure is a well-defined problem in literature. However, it is important to recognize that the problem of finding path connecting two events (from an anomaly to a potential breach state) is vastly different than earlier formulations. This is because most of the prior studies are done in the context of finding shortest paths connecting two nodes in a graph, or finding the shortest path between two nodes that satisfies user specified constraints. Finding a route on a map with minimum distance or the shortest route with specific constraints (such as having a gas station on the way) are examples of such problem. Unlike the route-finding problem in maps, the best answer to a question in the cyber security context (e.g. why is an event a potential threat?) is not completely derivable from a data-driven model. In most circumstances, human experts use "background knowledge" to determine risk, where "background knowledge" refers to information obtained from prior experience, or information that is not explicitly available in the data. The lack of explicit information is driven by practical limitations in data integration, the bottleneck of human knowledge acquisition. The fast pace of evolution of software and hardware systems is another reason behind this challenge. Security properties associated with the software and hardware systems in a cyber infrastructure evolve faster than we can systematically collect information about them.

This motivates us to embrace a human-in-the-loop approach, where we collect examples of question-answer for relevant analytics questions. The questions are posed in the context of Cyber Knowledge Graph entity pairs and answers are collected as pathways involving event nodes in the Cyber Knowledge Graphs. We also prompt human users to annotate the answers with a "rank" and provide justification for ranking.

Next, we train a Deep Neural Network architecture using the Long Short-Term Memory (LSTM) network as a building block. Robust training of the deep neural network models requires a large amount of data, which often outweighs the amount of question-answer pairs we can solicit from human experts. The introduction of question-answer metrics in terms of properties derived from the Cyber Knowledge Graph further enhances the applicability. In one embodiment we compute a set of metrics (defined later) for every human-specified question-answer pair. Next, we generate a large volume of question-answer pairs by first sampling entity pairs from different parts of the Cyber Knowledge Graph. Next, we generate candidate paths that connect each of the entities in a query. Since two nodes in the graph can be connected via a large number of paths, we only restrict ourselves to selecting discriminative paths between an entity pair and then rank them using the aforementioned metrics.

Bootstrapping with a small dataset collected from human user studies, this mechanism enables us to automatically expand the training dataset and learn a model with high capacity.

Similar to our event detection method, using the Deep Learning approach on the Cyber Knowledge Graph model requires us to transform relevant nodes and paths into a continuous vector space representation. Our proposed metrics to rank the user-specified question-answer pairs are derived from this continuous vector space information representation. One proposed metric is "Coherence". Given a path composed of Cyber Knowledge Graph nodes, its coherence is measured in terms of tightness of the nodes in the high-dimensional vector space. Another proposed metric is "Specificity". Given a path composed of Cyber Knowledge Graph nodes, its specificity is measured in terms of the relative importance of the nodes, and the frequency (or rarity) of the relationships that connects them.

Our user studies indicate the answers with highest coherence and specificity are most preferred. Next, we build a Deep Neural Network using two layers of Bi-Directional Long Short-Term Memory Networks, an Attention Layer, and a Dense Network layer. Given an event sequence and a pair of query entities, we develop an algorithm to perform a graph walk as guided by the model. Given a graph and two query nodes, a graph walk is a process that involves stepping through intermediate nodes and finding a path that connects the query nodes. While visiting a node during the walk, it involves exploring all the neighbors of the node to determine where to visit next. We deviate from traditional methods in that our graph walk is steered by the machine-learning model described as above. Given the query nodes, and a partial trajectory the machine-learning model predicts a point in high-dimensional vector space to visit next. We implement a membership operator that provides a reverse mapping of the vector space point to a node in the graph and select it as the next node for visiting.

Finally, we provide a commonplace example of such "explanatory questions" and "answering strategies". Assume that a financial analyst is tasked with discovering emerging business trends. He finds that Ford Motors have recently imported a high volume of Palladium, which is unusual given its past history of import-export records. Thus, we pose an "explanation query" with the pair (Ford Motors, Palladium) and seek to find a meaningful path through a Knowledge Graph that explains their relationship. Given the a semantic graph representation of Wikipedia, we find the three following answers:

Ford is a Car Manufacturer, Car Manufacturer make Cars, Cars contain Catalytic Convertors, Catalytic Convertors uses Palladium.

Ford is a Manufacturer, Manufacturer makes Products, Products use Rare Earth Mineral, Palladium is a Rare Earth Mineral.

Ford has headquarters USA, USA was involved in cold war with Russia, Russia is major supplier of Palladium.

Our ranking metrics indicate that the first answer has highest coherence and specificity. The second answer scores lower with specificity, while the third answer has lowest coherence.

RISK ESTIMATION AND RECOMMENDATION: Another capability of the present disclosure focuses on recommendations for altering the cyber infrastructure configuration to lower the possibility of a security breach. In one particular arrangement, the invention exists in a computer-implemented method of administering a resilient cybersystem and a system for implementing such a method. In particular the method includes the steps of creating a heterogeneous network of networks model of the cybersystem using at least one tripartite arrangement containing at least two subgraphs; each subgraph representing a distinct activity within the cybersystem, analyzing user traffic within the cyber system utilizing the model to ascertain anomalies within the cyber system and restricting activities such as a user's access to a portion of the cyber system based upon identification of anomalies using the model. In some instances, these subgraphs could include a user-host graph and a host-application graph and in some cases the tripartite networks model could model the interaction between the user, the host and the application. In some cases the analysis of user traffic includes determining the presence of a lateral attack by finding a graph-walk problem.

The creation of a heterogeneous network of networks model could include developing an abstraction of a mission (such as an IT network or a node within the IT network, or a device or account within the IT network) in terms of concrete entities whose behavior can be monitored and controlled. The restriction of access within the system could be instigated based upon the identification of calculated reachability score above a predefined threshold. The predefined threshold in some instances can be coordinated with various graded levels of access or activity restriction within the system. In some application the step of restricting further restricting access within the system includes calculating a reachability score reflective of the scope of a potential attack, and tailoring the scope of restrictions to the areas within the scope. This calculation can be performed with a greedy algorithm or other process appropriate for performing such a calculation.

A resulting implementation of the method could result in a cybersecurity system having a security feature that includes a heterogeneous network of networks model of the cybersystem, the model comprising at least one tripartite arrangement having at least two subgraphs, that monitors and reviews activity in the system and identifies and assess threats to the system and provides information to trigger compensatory measures to restrict access or activity within the system or otherwise mollify potential dangers to the system or portion of the system. In some instances the tripartite model includes subgraphs representing a user-host graph and a host-application graph or a user-host-application model.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE EMBODIMENTS

Figure 1:
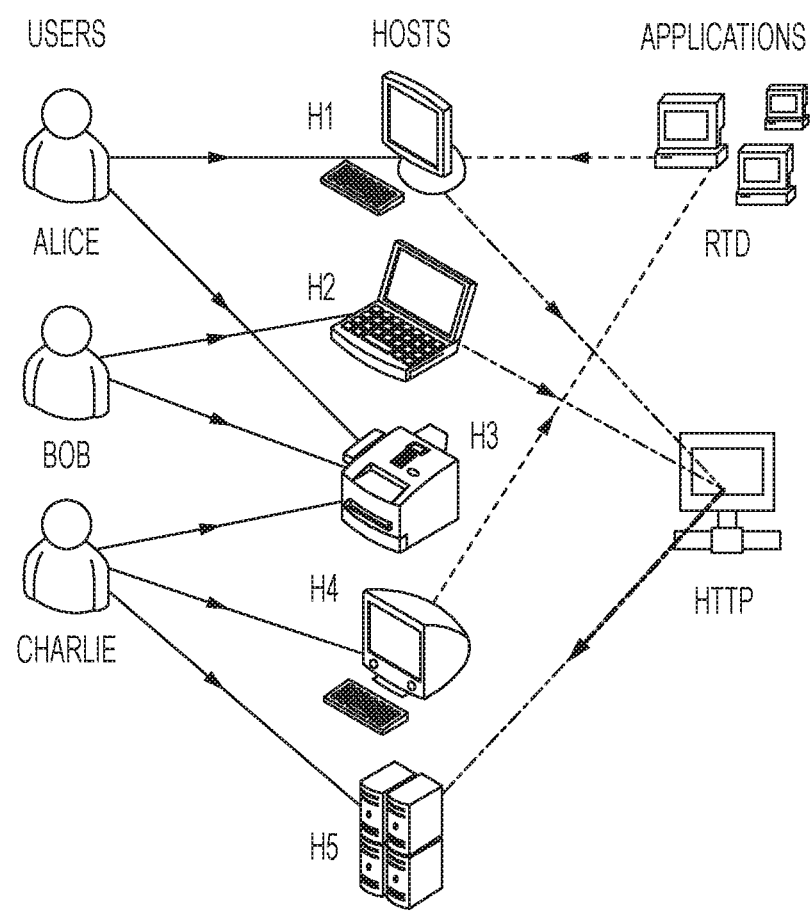
FIG. 1 shows examples of various relationships between entities in a typical system.

The description provided on the following pages includes various examples and embodiments. It will be clear from this description of the disclosure that the invention is not limited to these illustrated embodiments but that it also includes a variety of modifications and embodiments thereto. Therefore the present description should be seen as illustrative and not limiting. While the descriptions are susceptible of various modifications and alternative constructions, it should be understood, that there is no intention to limit the invention to the specific form disclosed.

Building resilient systems for use both today and tomorrow requires algorithms to continuously answer questions akin to those posed to human experts: 1) is there a problem? 2) What kind of problem is it? 3) How can we change the system to deal with the problem? 4) What are the implications of these changes? These questions naturally map into decision making processes such as OODA loop that involves observe (collecting information), orient (processing the information), decide (determining a course of action) and act (implementing the action) phases. In this disclosure these simple, critical questions are used to propose solutions based on machine-learning techniques applied to graph theoretic models. Graphs have generally been popular for modeling the connectivity across multiple entities, such as a network of machines. However, defending today's complex cyber infrastructures requires thinking in terms of graphs not only at the network traffic level, but understanding security dependencies that are created by relations between users, machines, and applications.

In one set of embodiments these security dependencies and relations can be categorized into various types, for example: Relations induced by Access Control: Typically, a user has multiple registered devices that interact with the system. Therefore, infiltration of one device can potentially compromise other devices registered to the same account. It is possible that no direct traffic between two devices is discovered, but both may be controlled by an attacker from outside of the enterprise. Relations between Applications: A content management system (CMS) may pull information from a database hosted in a different part of the network. If the CMS is tied to a mission critical application, its availability and integrity now are tied to the vulnerability of the database server, the network host where the database service is running, and the user's security configuration running the service (e.g., password strength, etc.). Many attacks begin with access obtained through social engineering techniques, such as sending phishing emails. Once a user clicks on such an email, the attackers find a foothold within the enterprise and can traverse through the network exploiting security dependencies. As the attackers navigate the complex web of security dependencies, the defenders and the algorithms assisting them need to think in the same realm.

In one embodiment we utilize three techniques to address these issues. First, we describe a way to detect anomalies using a combination of graph-based algorithms and neural network. Second, we determine if an anomalous event presents a risk to an enterprise and automatically explain the risk to a user via historical example. Third, we model complex interactions between users, machines, and applications and recommend actions to exploit this structure to minimize risk around impacted resources or users. The following descriptions provide various examples of the implementation of such techniques.

Our first technique has a dual focus. We seek to detect anomalous behaviors in a cyber system and map the anomalous event to a specific attack tactics such as privilege escalation, defense evasion, command and control etc. Further, we seek to map the attack tactics to known groups of attackers. Such mapping allows an organization to determine attacker's intent and reason about which resources to defend with higher priority. In the rest of the discussion, we refer to this task as dual-task of Anomaly Detection and Attribution (ADA). Detecting an anomalous event alone is not enough or useful for a cyber defender. The information technology infrastructure of any organization generates a large volume of anomalous events every day. Also, the state of the art systems typically detects the anomaly and leaves the determination of attack techniques and further projection of intent to the human expert. The volume of events often outgrows the available resources in a security team. Therefore, most defense strategies focus on responding to anomalies around high-valued or well-known resources, which is a limiting approach to begin with. Post-mortem analysis from most security breaches reveal that attackers assumed valid user identities by compromising various non-descript systems those users had used or logged in. By augmenting the anomaly detection process to attribution of attack techniques and intent, we dramatically expands the monitoring scope in a security infrastructure.

Our data model and methodology is based on the concept of graphs. A graph is defined as a data structure describing the relationship (also referred to as edges) between a set of entities (also referred to as nodes). For example, we can model network traffic as a graph with every unique internet protocol (IP) address represented as a node in the graph. Communications between the IP addresses are summarized and represented as edges between the nodes. In other words, if two IP addresses exchange 10,000 packets during the observed period, we will summarize all of the communications as a single edge and use the total exchanged bytes or packet duration as edge weight. The set of entities and their relationships can belong to multiple classes. In one embodiment we utilized a tri-partite cyber network model that captures relationships between three classes of entities (hence the name tri-partite): In this example this included Network hosts: a network enabled device such as a personal computer, a mobile phone or a computer server. The host can have attributes such as resource type, unique ID. Users: an account used to control or perform actions on the machines, and Applications: software performing various local or cross-network actions across the hosts. The relationships across these features can also be modeled and correlated. As shown in FIG. 1 relationships across these entities could include 1. Has-access (user, host): Indicating user has access to host. Such relationship can also include an is-admin attribute and an application-set attribute capturing the services or applications it can access on the host. 2. Low-level event (host, host, application): Indicating a network flow from one host to another through a specific application protocol. It may also indicate an event that happens locally on a single host such as starting a browser without connecting to any server.

From this framework a series of deep learning approaches were applied to the information in the tripartite network model. Decisions by human analysts are not directly driven by low-level information such as network traffic or event logs. They are correlated with knowledge such as network topology, access control configurations, and behavioral patterns of different applications, services and users. Therefore, we model complex concepts such as events as a combination of entities drawn from the above set and their interactions. Insights derived from these data are further distilled to higher level concepts such as attack techniques, and even potential actors and their intents. Formally, such hierarchies can be represented by tree data structures as shown below. A principal idea behind Deep Learning is to learn complex representations by composing simpler representations in a hierarchical or multi-layer fashion. Thus, we define the ADA task as a tree-classification problem where the leaves of the tree are drawn from events described over the tri-partite network model.

Figure 2:
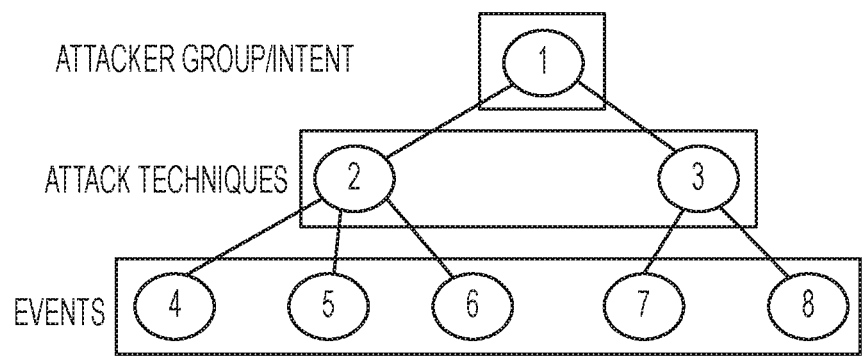
FIG. 2 shows the formation of a multiscale structure or neural network for modeling the attack.

FIG. 2 shows the formation of a multiscale structure or neural network for modeling the attack. We use a multi-scale neural network approach to perform this task. The first neural network operates on events described in terms of entities and relationships from the tri-partite network model. Low-level events are aggregated for entities of interest as drawn from the tri-partite network to form a sequence. The second is then input into a neural network that generates a probability of the sequence corresponding to an attack activity. The second neural network aggregates outputs from the first network. At the second layer, the aggregation need not be restricted to single-entity levels. We process the tri-partite network model to generate multiple groups of interest. For example, a group of interest refers to a set of users with same role, where role is determined by behavioral patterns observed in the host-host interactions as well as use of applications. Similarly, a group is defined to represent service clusters. A service cluster represents a set of hosts providing application services that are related by the same dependency.

Generally, we extract such groups using role-mining techniques, where a role is aimed to group nodes in a graph with similar features, whereas the features may be both structural (machines that connect to many other machines primarily through specific applications are denoted as servers) as well as attributes of the nodes and edge. Such attributes include: the total duration of all interactions a node participated in over the course of a day, the number of said interactions, the number of unique applications in communications where the given node is the source IP, the number of protocols used in interactions involving the given node, and the total numbers of packets and bytes exchanged in communications involving the given node.

Figure 3:
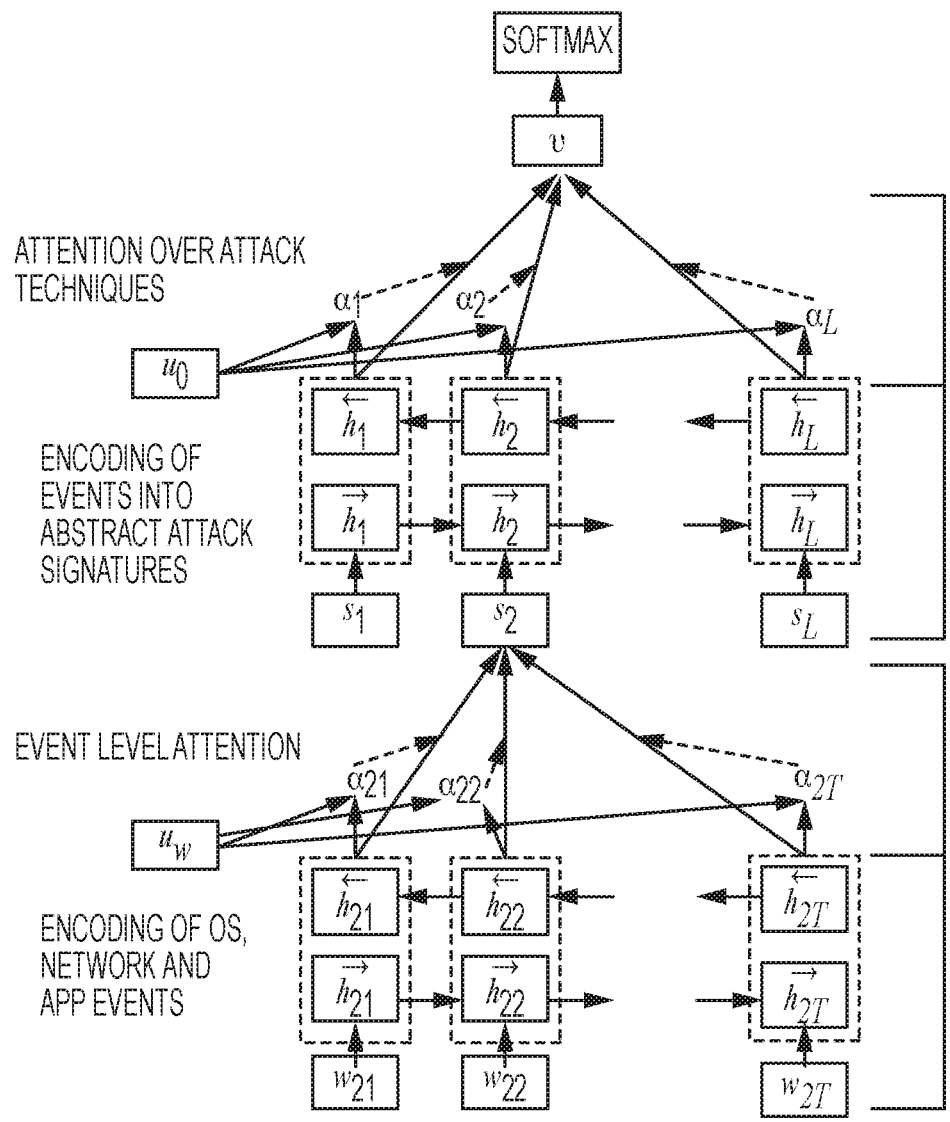
FIG. 3 shows an application of the method of the present disclosure in one application.

The neural networks classify sequences that represent nodes in a graph. The graph may represent the tri-partite network model itself, or another graph such as the multi-scale tree-structure derived from the tri-partite network model. Processing of the graph data structures using neural networks require a transformation of the graph data, in which the nodes of the graph are mapped to a high-dimensional vector space embeddings. In one example we used the well-known node2vec algorithm for learning these embeddings. FIG. 3 shows an application of the method of the present disclosure in one application. In this example the composition of multiple neural networks that operate on the multi-scale structure are derived from a graph model representing collective behavior of users, machines and applications in multi-source cyber applications.

Attention mechanisms have been shown to be a critical performance driver for deep learning algorithms. Attention mechanisms allow us to specify the importance of an entity in a given context. They allow the model to learn its relative importance in the given context, without treating every entity with equal importance. Such mechanisms are continuously reflected in human conversations, where the relevance or value of a word, whether it is a name of an entity, a verb or adjective, strongly depends on the context. In the cyber parlance, the communication with a specific class of server can be used to establish a baseline behavior of a group of users with same role. However, communication with the same server can represent an anomaly for a user in a different role. The attention mechanism also changes depending on the target context. Some attack techniques (such as the variants of a ping sweep) are employed by multiple attacker groups, and is often a first step for exploring a breached infrastructure. Therefore, while observing a "ping sweep" event is useful to conclude an attack activity from low-level event observations, it is not very useful to determine the specific intent behind the attack. Specifically, given an entity and a specific context represent as a set (unordered sequence) or a sequence of entities, an attention function needs to compute the importance of that entity in that context. We compute the attention functions by extracting node-level graph metrics (such as degree, page rank and distributional statistics derived from label and motif distributions) from the tri-partite network model and the derived multi-scale graph model.

Detection of an anomaly is followed by attribution. Attribution is a critical step for explaining the evolution of an attack or confirming the presence of a security breach. We describe the task of attribution as returning a subset of data that provides a concrete example of the hypothesized attack or breach. Most of the state of the art anomaly detection techniques focus on computing a point-wise or entity-level divergence score, where the score indicates the degree to which the entity deviates from its normative pattern of behavior. Some systems also report pairwise anomalies, whereas a score is computed to measure the strength of association between two entities. Typically, such scores are computed via Link Prediction techniques. However, such computation of scores are limiting for attribution, or efficiently explaining the event that caused the anomaly. For example, consider a software engineer who frequently logs into a computational cluster from his desktop. Assume that he also logs into company's email server from his mobile using a virtual private network (VPN) gateway. However, if we observe a login from his mobile to the computational system through the gateway, it will need to be flagged or reported. Using pointwise scores (that employees action deviated from normal) or pairwise scores (that unusual login occurred from mobile to the VPN gateway) is limiting as it does not fully explain the context. It leads to loss of information or important contextual information.

This motivates us to consider approaches to use data representations that are more descriptive than an (entity, score) pair, or (entity-pair, score) pair. Instead, we use a subgraph-based representation to capture the event with complete context. Next, we translate the event graph into a sequence using a canonical ordering defined by a domain-based ontology. The canonical ordering ensures that events of similar types are translated into the same sequence even if their data elements appear in the data in differing order. Not all events are reported with the same level of information. In fact, it is rather expected to have different data collection modules represent the same event in different ways depending on their version and underlying software platforms. Finally, we use a neural network based algorithm to process the sequence generated from the event subgraph and rank them.

Figure 4:
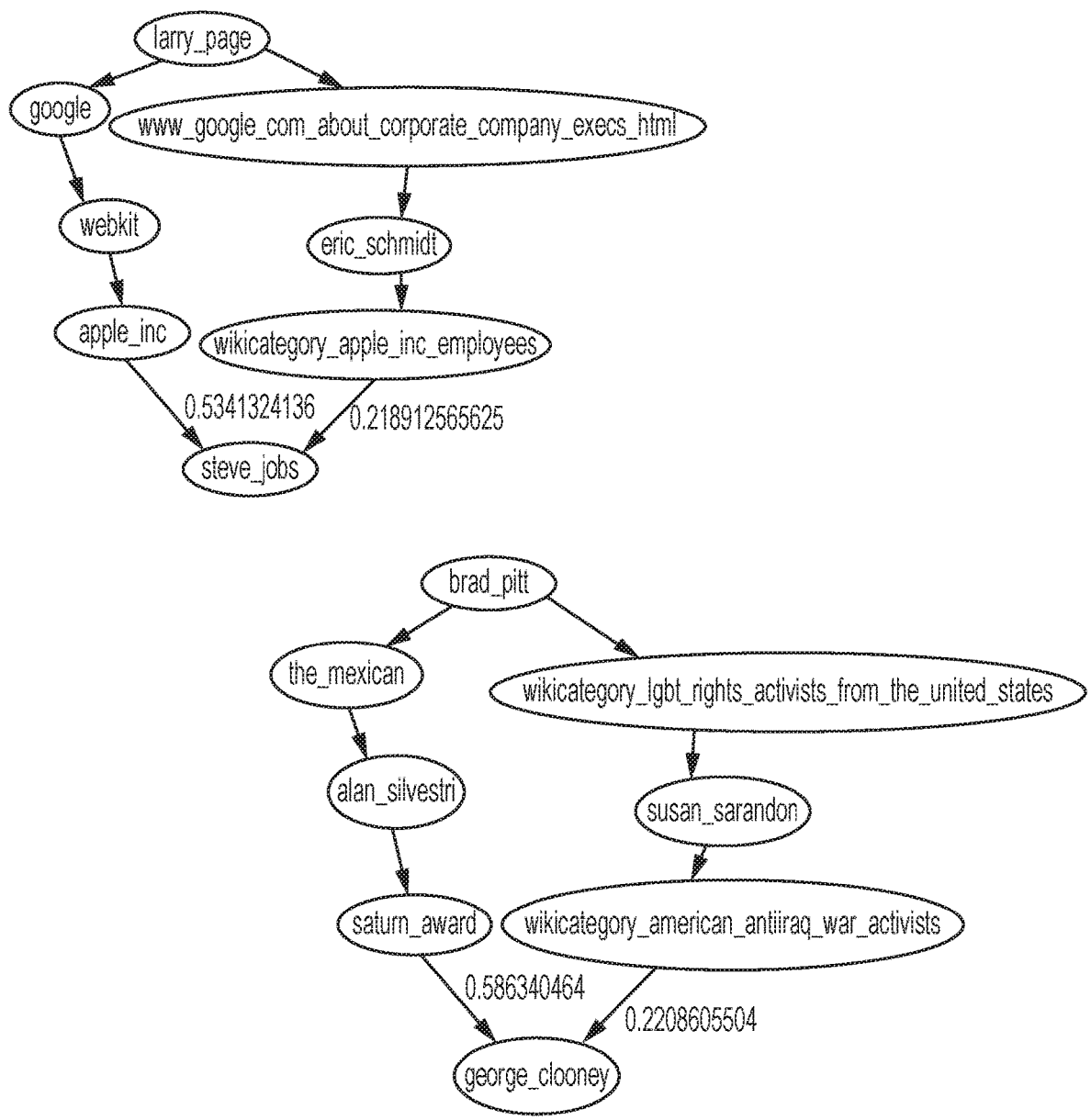
FIGS. 4 and 5 shows additional examples of implementations of the present disclosure.
Figure 5:
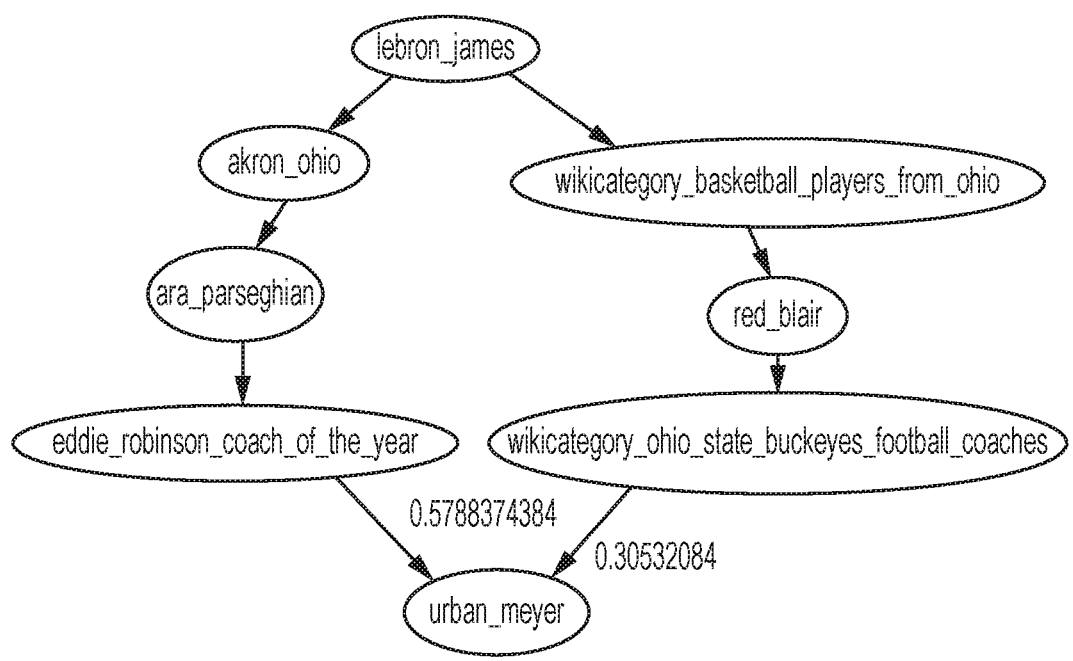

In one example we specifically used a variant of Recurrent Neural Network such as Long-Short Term Memory Network (LSTM) to learn the vector space embeddings for each node in the graph. Given a sequence representation of an event subgraph, we compute the following scores: Coherence: We define the coherence of a sequence as the variance of sequence elements' vector space embeddings. Specificity: Given a sequence of elements representing graph nodes, we measure specificity as the median of degree (or other graph-theoretic metric such as PageRank or Centrality) values extracted from the sequence. Assuming the graph node embeddings are learned with sufficiently high accuracy, our experiments and user studies reveal high effectiveness of these metrics to reveal meaningful relationships between a set of entities. Most importantly, these metrics provide with a means to evaluate the likelihood of a subgraph occurring with a collection of entities in the absence of any labeled data. In an ideal condition, when labels are available for each such sequence, we can proceed further to train a model and classify the subgraphs as belong to specific categories. Examples of such arrangements are found in FIGS. 4 and 5.

Figure 6:
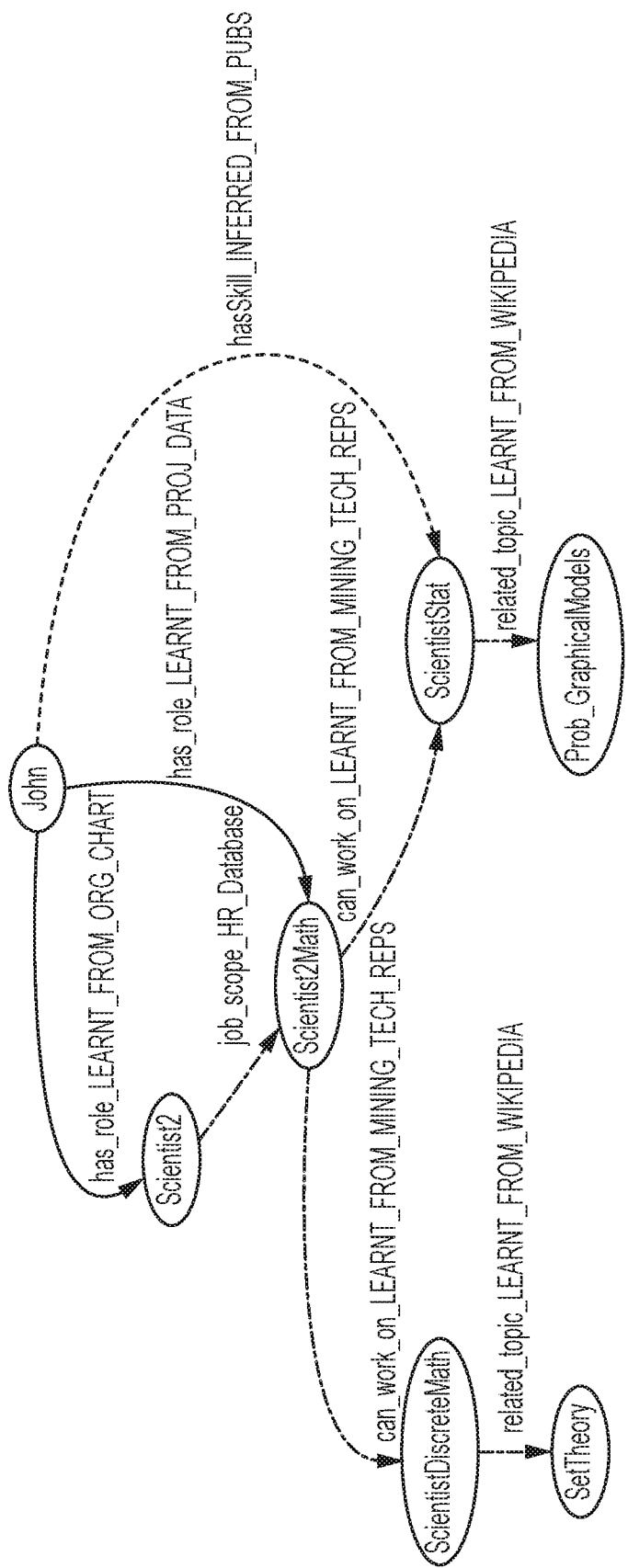
FIG. 6 shows an example of how graph-based models can be effective in determining a profile for a user.

We illustrate the impact of the disclosure in multiple cyber application scenarios as follows: Consider John, an employee working on a Department of Energy project who launches a job in his organizational cloud-based environment. Our goal is to categorize that activity as normal or unusual. FIG. 6 shows how graph-based models can be effective in determining a profile for John and establish normative behavior. We first develop a behavioral profile for John, which is obtained by aggregating multiple data sources into a single knowledge graph. As FIG. 6 shows, each edge between nodes may indicate a different relation, potentially learned from a different data source. FIG. 6 is a knowledge graph capturing an employee's profile. The text in uppercase points to a potential data source from which the relation was discovered.

Figure 7:
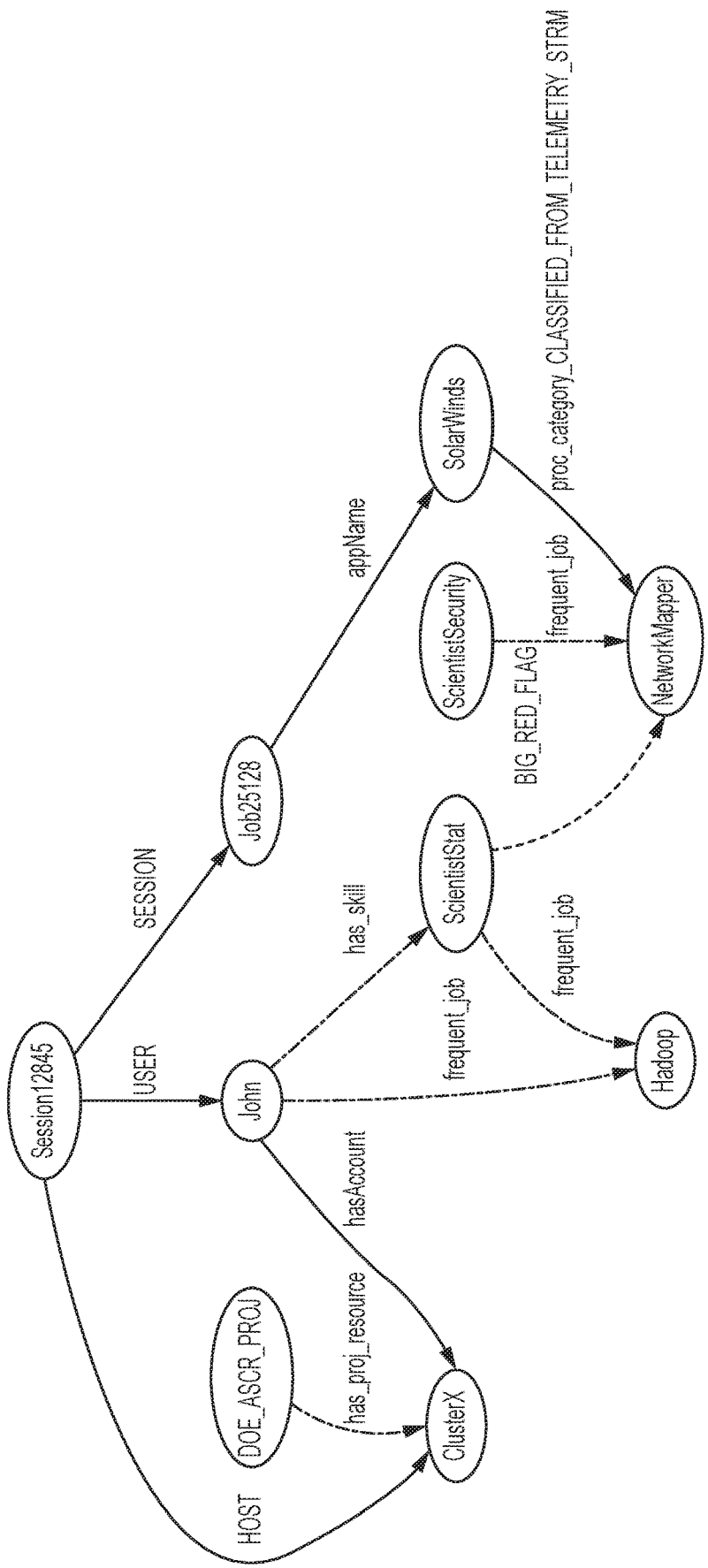
FIG. 7 shows the interaction of models of various types of data can be arranged and presented.

The following illustrates a graph-based model of an event in which John launched an unusual job on a cluster. Starting with a basic job description, we use the graph structure to infer the type of software or systems he is likely to use for daily work. For example, researchers working on machine-learning techniques are more likely to use graphical processing unit based systems. We extend such inference abilities by studying the context of John's projects that allows us to reason about the network resources he should use. At this point, we know that John is a statistician working on high-energy physics projects. Finally, we ingest high-speed telemetry and log data streams and observe that John launched a "SolarWinds" process, a well-known network mapping tool (see FIG. 7). This is clearly inconsistent with the behavioral patterns we have learned about statisticians and high-energy physicists. By continuously running queries that aim to detect behavior that is inconsistent with historic patterns, we conclude that John initiated a computing task that can be risky for the overall enterprise. FIG. 7 shows an example of how multiple data sources (high-speed telemetry data and behavioral patterns obtained from knowledge graph) can be unified in a single model for decision-making.

Figure 8:
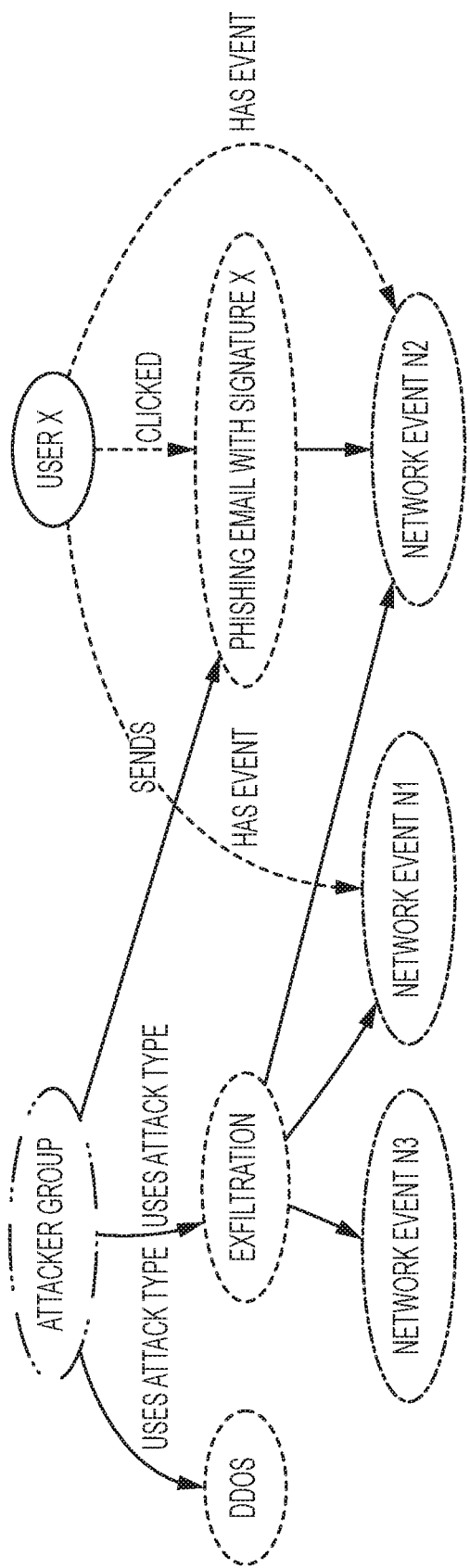
FIG. 8 shows an example of event detection in cyber network using hierarchical attention model.

FIG. 8 shows an example of event detection in cyber network using hierarchical attention model. FIG. 8 shows embodiment of event detection using hierarchical model in a cyber event graph. The green nodes indicate low level events observed in network or machines, blue nodes indicate an attack type and red node indicates the attacker group. An attacker group can be mapped to its known attack signatures, while each attack type can be mapped to sequence of low level events. The hierarchical model learns these dependencies, enabling the identification of low level event to higher level attack types; and subsequently to a set of set of attacker groups.

Figure 9:
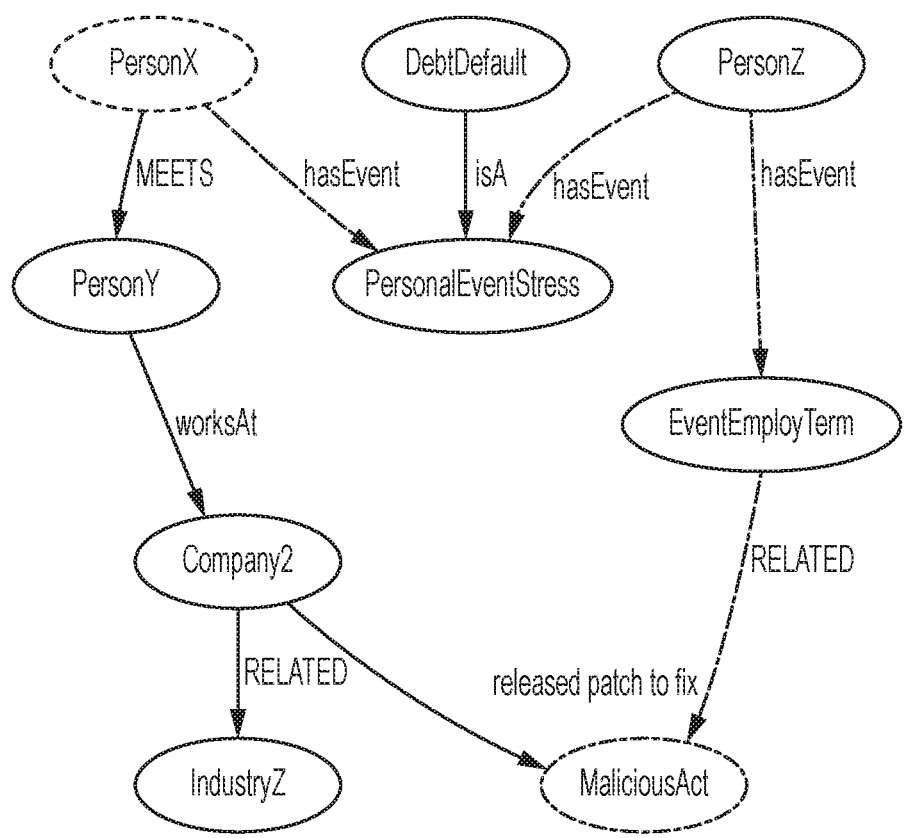
FIG. 9 demonstrates the embodiment of explanation mechanism in a cyber/social graph and demonstrates how a connection between Person X and Malicious Act can take place.

FIG. 9 demonstrates the embodiment of explanation mechanism in a cyber/social graph and demonstrates how a connection between Person X and Malicious Act can take place. As indicated multiple paths may exist in the graph connecting "Person X" to "Malicious Act". Using path coherence and specificity metrics for attention, we identify a reasonable explanation using historical example (shown in green), where another person "Person Z" under "Personal Stress" performed a malicious act.

Figure 10:
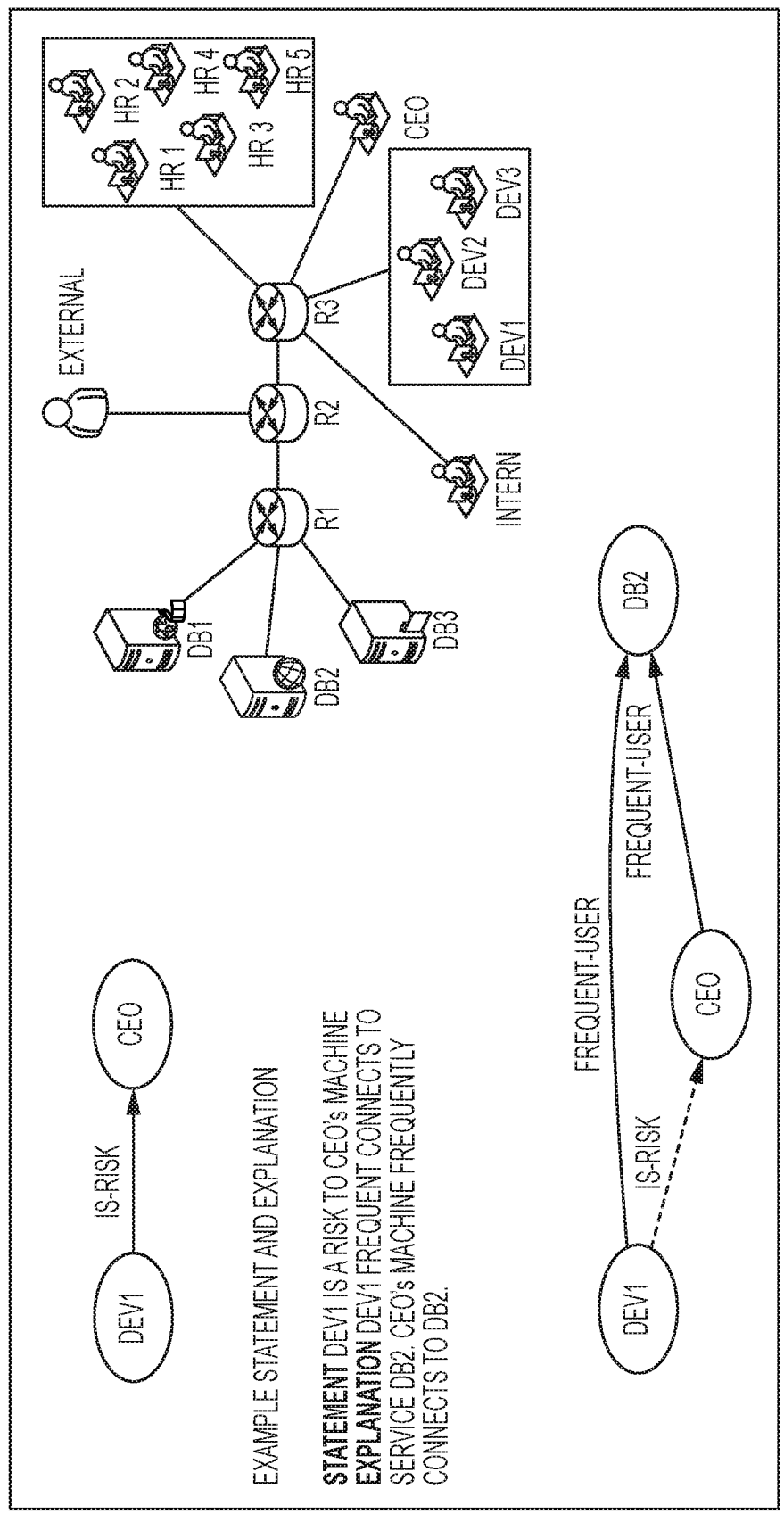
FIG. 10 shows a simple network infrastructure.

FIG. 10 shows a simple network infrastructure. Now, imagine we get some system alerts on a developer's system. An analyst does not solely act on the alert. He accounts for recent observed behavior in actual, high-volume observations (such as network traffic, event logs) and determines if the involved resource or user account is compromised. He also maps the event to a phase in the kill-chain, or tries to infer about potential attacker types and their intents. We refer to this as phase 1 and denote as Abstract Event Detection task. In short, phase 1 will aim to connect an event reported by the analytics to an attacker. Next, the analyst tries to reason about risk. If a host or a user is compromised, does it present a risk to the enterprise? This requires finding a potential path from the compromised resource to a compromised state of a high-value target. We denote this as phase 2 and denote as Explanation (or reasoning) task.

Figure 11:
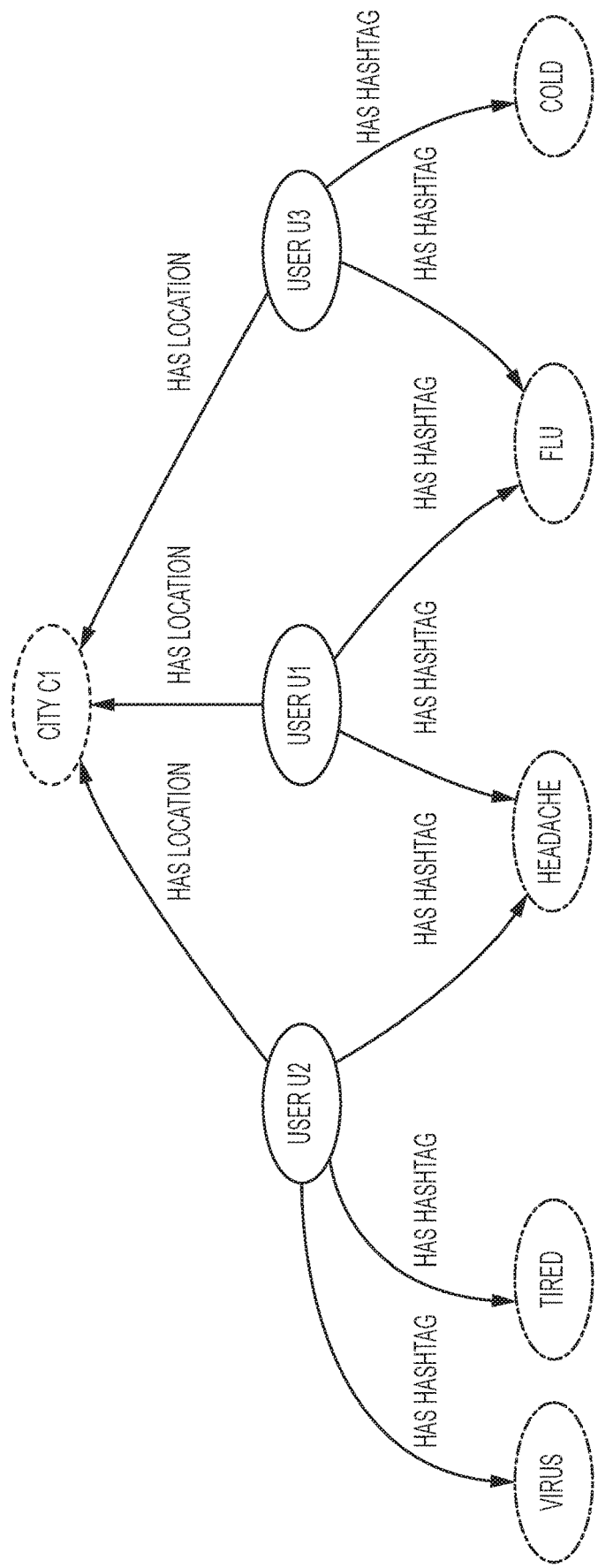
FIG. 11 shows an embodiment of event detection for "Flu" using a twitter graph from a known location.
Figure 12:
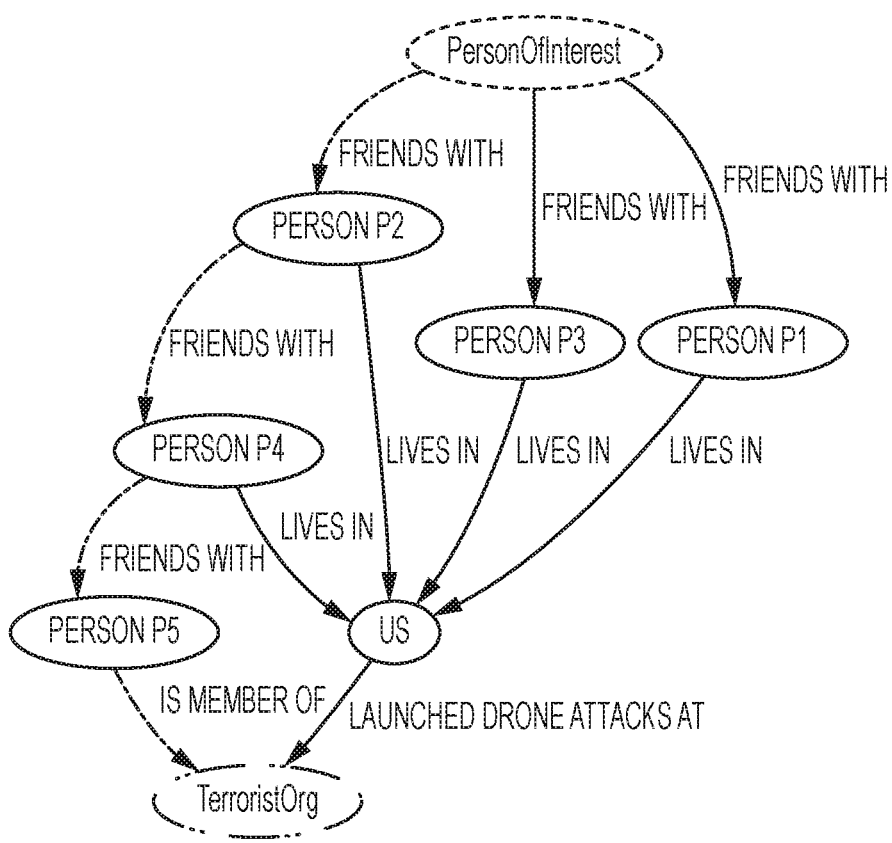
FIG. 12 shows explanation embodiment in social network like Facebook.
Figure 13:
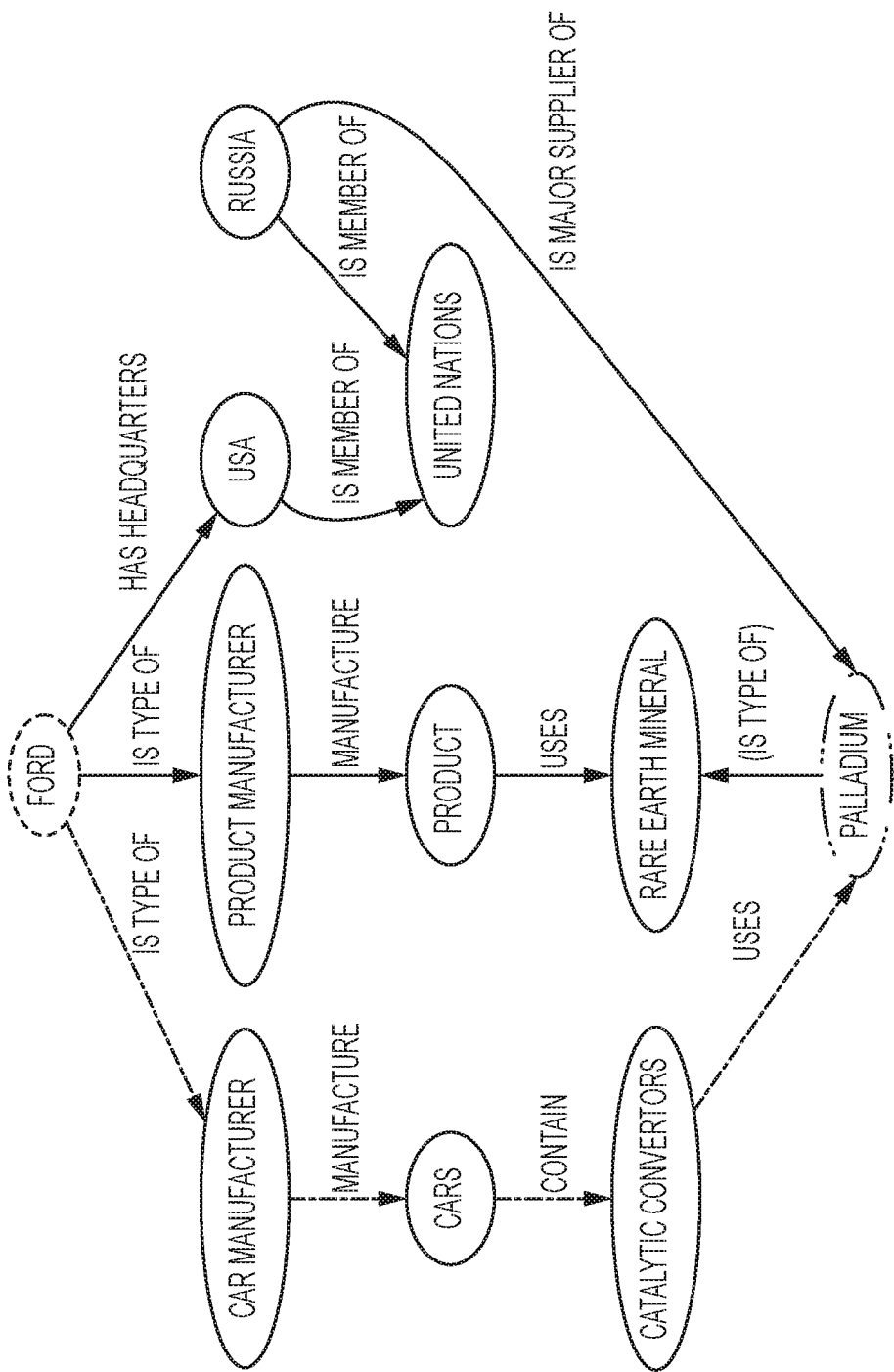
FIG. 13 shows an example of an explanation for an alternative application such as in a stock market scenario

FIG. 11 shows an embodiment of event detection for "Flu" using a twitter graph from a known location. A location consists of group of users and users can be mapped to set of keywords. The hierarchical attention model will be used to detect event of interest at a given location using keyword that are relevant to a given event. FIG. 12 shows explanation embodiment in social network like Facebook. As indicated, a person of interest may be connected to terrorist organization through meaningless paths like "living in USA". Explanation generation using coherence and specificity captures the relevant path as the chain of "friendship" relations shown in green. FIG. 13 shows an example of an explanation for an alternative application such as in a stock market scenario attempting to answer the question: Why "Ford imported Palladium" Explanation model using coherence and specificity clearly distinguishes answer at right (Ford→US→UN→Russia→Palladium) as being unrelated to the question posed. Further between answer at left, vs one in middle, a human may prefer a more "informative" answer rather than a generic answer.

Defining lateral movements as graph-walks allows us to determine which nodes in the tripartite graph can be reached starting at a given node. From an attacker's perspective, these nodes that can be "reached" are exactly those mission components that can be attacked and compromised via exploits. The greater the number of nodes that can be reached by the attacker, the more "damage" the attacker can render to the mission or resource. Given a system snapshot and a compromised workstation or mobile device, we define the "Attacker's Reachability" as a measure that estimates the number of hosts at risk through a given number of system exploits. From a defender's perspective, putting some defensive control on one of these nodes (or edges) allows the walk to be broken at that point and the mission to be protected. Such walk breaks can then be used to identify mission hardening strategies that reduce risk.

Given the heterogeneity of a cyber system we consider effective hardening strategies from different perspectives. Rather than focusing on manipulating the network topology under the assumption that the graph is homogeneous (all nodes have an identical role in a cyber system), we instead present a framework for modeling lateral movement attacks and propose a methodology for designing mission critical cyber systems that are resilient against such attacks. By modeling the enterprise as a tripartite network reflective of the interaction between users, machines and applications and propose a set of procedures to harden and strengthen the network by increasing the cost of lateral movement and preventing intrusions and predefined locations.

In one example we model lateral movement attack on a mission as a graph-walk problem on a tripartite user-host application network that logically comprises two subgraphs: a user-host graph and a host-application graph. The tripartite network consisting of a set of users, a set of hosts and a set of applications is shown and modeled (examples of modeling tools for such activities could be a Markov Random Field. In addition, interaction between the network and a user, their device, and a particular application are then also modeled. (While these items are described it is to be understood that a variety of other items including load characteristics, access control, user role and network flow or other features. Preferably this is done with learned data but it could also be done based upon a preprogrammed profile instead.

From these inputs and against these models, a series of comparisons can be made. This can be done for example, using a Gibbs sampling to draw from these distributions and to reflect various policies so as to protect the mission. With the understanding of these distributions, various policies can be put in place to protect the network when an out of place element is detected. The present methodology enables a System to be Protected Against Lateral Attacks with Significantly Fewer (Approximately ⅓) changes to the system and with less disruption to the activities of the legitimate user. If a user (Charlie) accesses a network at a certain time each day (8 am) from a particular machine or device (his tablet) and accesses a select number of applications (email) a profile can be established and modeled mathematically as a distribution of such a combination of such factors by segmentation on a user-host access graph. Against this model then activities from this user can then be compared and deviations from the model identified and analyzed and as necessary actions can be taken with regard to the particular user on account of their out of model behavior so as to prevent lateral movement within the system and to protect mission components.

For example, if user Charlie modifies his access configuration by disabling the access of the existing account (Charlie-2) to host H3 and by creating a new user account (Charlie-1) for accessing H3. An attacker cannot reach the data server H5 though the printer H3 if Charlie-2 is compromised. In addition to this measure, other measures such as edge hardening in host-application graph via additional firewall rules on all network flows to H5 through HTTP, Node hardening in host-application graph via system update or security patch installation on H5 and defining lateral movements as graph walks allows us to determine which nodes in the tripartite graph can be reached starting at a given node.

Figure 14:
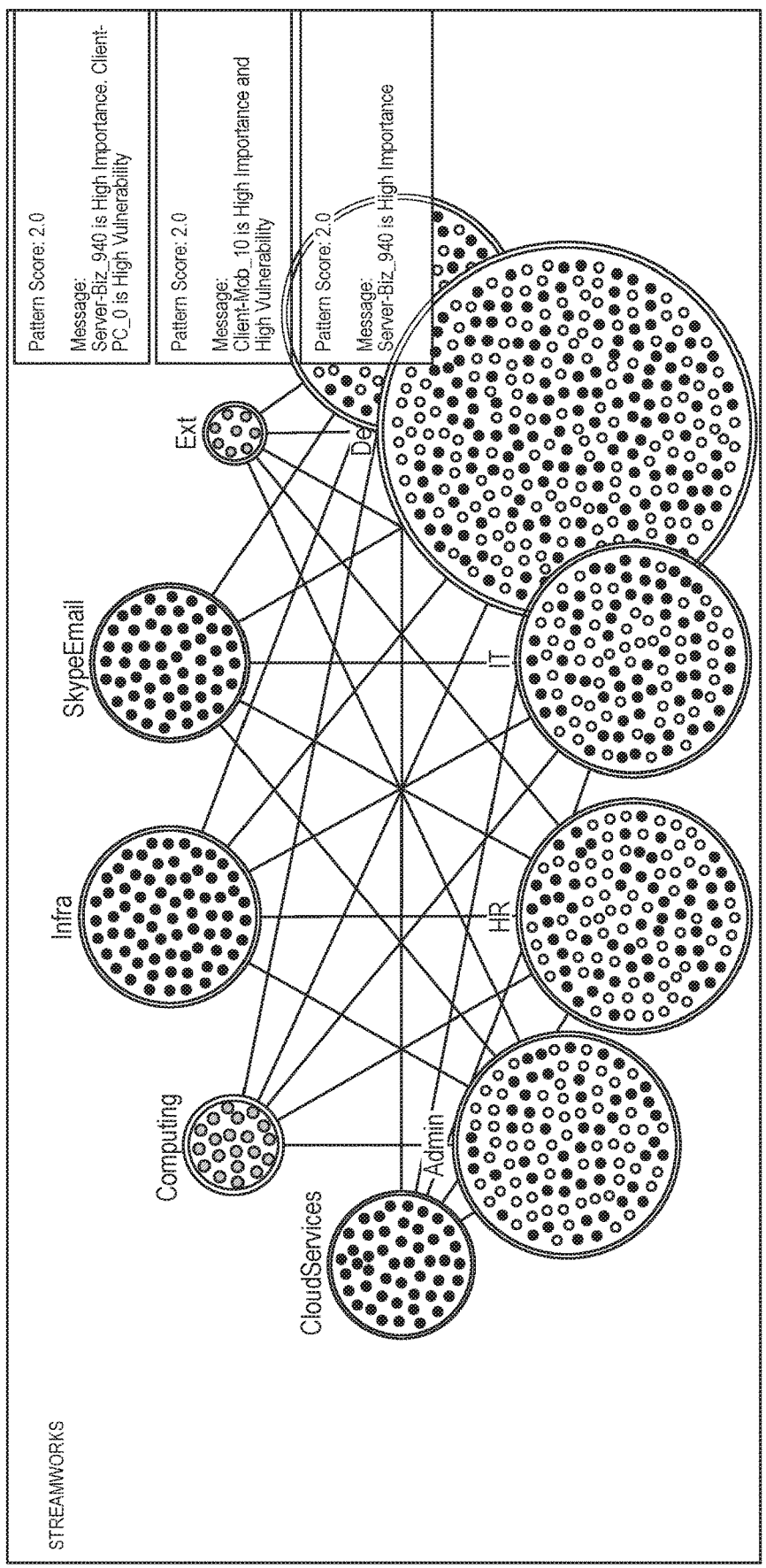
FIG. 14 shows examples of a screenshot from on instantiation of the invention.

From an attacker's perspective, the nodes that can be "reached" are the mission components that can be attacked and compromised via exploits. The greater the number of nodes that can be reached by the attacker, the more "damage" he/she can render to the mission. Given a system snapshot and a compromised workstation or mobile device, we can define the "Attacker's Reachability" as a measure that estimates the number of hosts at risk through a given number of system exploits. From a defender's perspective, putting some defensive control on one of these nodes (or edges) allows the walk to be broken at that point. The heterogeneity of a cyber system entails a network of networks (NoN) representation of entities in the system allowing us to devise effective hardening strategies from different perspectives. Examples of a screenshot from such a configuration is found in FIG. 14.

This differs from other models which focus on manipulating the network topology under the assumption that the graph is homogeneous, that is, all nodes have an identical role in a cyber system. Our model commences from a distinct premise namely that the cyber system is heterogeneous and thus incorporates several defensive actions for enhancing the resilience to lateral movement attacks. Further examples and details of the proposed method are outlined in the additional information.

By modeling lateral movement attacks as graph-walks on a user-host-application tripartite graph, we can specify the dominant factors affecting attacker's reachability and propose greedy algorithms for network configuration changes to reduce the attacker's reachability of various parts of the system. We describe and characterize the effectiveness of three types of defensive controls against lateral movement attacks, each of which can be abstracted via a node or edge operation on the tripartite graph. We provide quantifiable demonstrations on the performance loss of the proposed greedy algorithms relative to the optimal batch algorithms that have combinatorial computation complexity. We apply our algorithms to a real tripartite network dataset collected from a large enterprise and demonstrate that the proposed approaches can significantly constrain attacker's reachability and hence provide effective configuration recommendations to secure the system.

While described in a particular paradigm this model and its associated techniques have applicability in many other security domains. Two such areas are security in online social networks (OSN) and in mobile networks. The problem space in OSNs that we have in mind is that of attackers creating fake accounts to target the trust underpinnings of the OSN. The attacker using fake accounts establishes trust relationships with unsuspecting users. This can then be used to launch different types of attacks on the OSN such as spam distribution, wasting advertising clients' resources by making the clients pay for spurious ad clicks or privacy breaches for users of OSN. Preventing lateral movement in mobile networks is even more challenging, and one can easily see the necessity for constructing a heterogeneous graph model as we have done.

In another aspect segmentation on user-host graph can be used as a countermeasure for suppressing lateral movement attacks. Segmentation works by creating new user accounts to separate user-host in order to alleviate the reachability of lateral movement. Segmentation can remove some edges from the access graph GC and then merge these removed edges to create new user accounts. In doing so the same access functionality is retained while the constraints on lateral movement attacks at the price of additional user accounts are described. Various segmentation strategies are described hereafter.

In one embodiment; a graph containing 5863 users, 4474 hosts, 3 applications, 8413 user-host access records and 6230 host-application-host network flows was accumulated. All experiments assume that the defender has no knowledge of which nodes are compromised and the defender only uses the given tripartite network configuration for segmentation and hardening. To simulate a lateral movement attack we randomly select 5 hosts (approximates 0.1% of total host number) as the initially compromised hosts and evaluate the reachability, which is defined as the fraction of reachable hosts by propagating on the tripartite graph from the initially compromised hosts.

The initial node hardening level of each host is independently and uniformly drawn from the unit interval between 0 and 1. The compromise probability matrix P is a random matrix where the fraction of nonzero entries is set to be 10% and each nonzero entry is independently and uniformly drawn from the unit internal between 0 and 1. The compromise probability after handing, $k_j$, is set to be 10 $^{?}$ 5 for all k and j. All experimental results are averaged over 10 trials. Various segmentation strategies proposed on the user-host graph. In particular a greedy host-first segmentation strategy has been shown to be an effective approach to constrain reachability given the same number of segmented edges because accesses to high connectivity hosts (i.e., hubs) are segmented. For example, segmenting 15% of user-host accesses can reduce the reachability to nearly one third of its initial value. Greedy segmentation with score recalculation is shown to be more effective than that without score recalculation since it is adaptive to user-host access modification during segmentation. Greedy user-first segmentation strategy is not as effective as the other strategies since segmentation does not enforce any user-host access reduction and therefore after segmentation a user can still access the hosts but with different accounts.

In practice a user might be reluctant to use many accounts to pursue his/her daily jobs even though doing so can greatly mitigate the risk from lateral movement attacks. We also investigate the impact of user-host access information asymmetry on lateral movement attacks. Information asymmetry means that the defender uses complete user-host access information for segmentation whereas the attacker launching a lateral movement attack can only leverage the known user-host-access information. Lateral movement attacks can be constrained when sufficient segmentation is implemented and the user-host access information is limited to an attacker, otherwise a surge in reachability is expected.

Various hardening strategies can be proposed. Greedy edge hardening strategies with and without score recalculation have similar performance in reachability reduction, and they outperform the greedy heuristic strategy that hardens edges of highest compromise probability. The proposed edge hardening strategies indeed appear to find the nontrivial edges affecting lateral movement. Node hardening strategies using the node score function _ and _J lead to similar performance in reachability reduction, and they outperform the greedy heuristic strategy that hardens nodes of lowest hardening level.

Our experiments performed on a real dataset demonstrate the value and powerful insights from this unified model with respect to analysis performed on a single dimensional dataset. Through the tripartite graph model, the dominant factors affecting lateral movement are identified and effective algorithms are proposed to constrain the reachability with theoretical performance guarantees. The results showed that our proposed approach can effectively contain lateral movements by incorporating the heterogeneity of the system. Generalizing the described applications into work for k-partite networks to model other dimensions of behavior (authentication mechanisms, social profile of users etc.) are also envisioned for further extension.

While various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A computer-implemented method of protecting a cyber system, the method comprising:
    modeling the cyber system as a heterogenous network of nodes using a tripartite user-host-application graph comprising a user-host sub-graph and a host-application sub-graph;
    transforming the tripartite user-host-application graph into a tabular representation that preserves topological properties of the nodes, wherein each of the nodes from the tripartite user-host-application graph comprise a point in multidimensional vector space within the tabular representation;
    analyzing user traffic within the cyber system based on the tabular representation to identify one or more anomalies within the cyber system; and
    generating at least one modification to the cyber system to restrict activity within the cyber system based on the identified anomalies and the modeling.

2. The method of claim 1, wherein the tripartite user-host-application graph comprises a hierarchical aggregation of information, from high-resolution, narrower context to coarser-resolution, broader context.

3. The method of claim 1, wherein at least one of the anomalies comprises an abstract event or a kill-chain event.

4. The method of claim 1, further comprising:
    performing a graph-walk based on the tripartite user-host-application graph.

5. The method of claim 1, wherein at least one of the anomalies comprises a graph-walk problem indicative of a lateral attack.

6. The method of claim 1, wherein the analyzing the user traffic uses a Long-Short Term Memory (LSTM) neural network to ascertain the anomalies.

7. The method of claim 6, wherein the LSTM neural network comprises an attention layer and a dense network layer.

8. The method of claim 1, further comprising:
    calculating respective specificity scores for the identified anomalies indicative of relative importance of the nodes associated with each the respective anomalies; and
    wherein the generating the modification is further based on the specificity scores.

9. The method of claim 1, further comprising:
    calculating coherence scores for the identified anomalies indicative of relative tightness of nodes associated with each of the respective anomalies; and
    wherein the generating the modification is further based on the coherence scores.

10. The method of claim 1, further comprising:
    calculating reachability scores for the identified anomalies indicative of relative numbers of nodes accessible by each of the respective anomalies; and
    wherein the generating the modification is further based on the reachability scores.

11. The method of claim 10, wherein the generating the modification comprises inputting the reachability scores into a greedy algorithm.

12. The method of claim 11, wherein the greedy algorithm outputs respective scopes of restriction for the anomalies based on the reachability scores.

13. A system comprising a series of circuitry that implements a cyber security feature, the cyber security feature configured to:
    model an associated cyber system as a heterogenous network of nodes using a tripartite user-host-application graph comprising a user-host sub-graph and a host-application sub-graph;
    transform the tripartite user-host-application graph into a tabular representation that preserves topological properties of the nodes, wherein each of the nodes from the tripartite user-host-application graph comprise a point in multidimensional vector space within the tabular representation;
    analyze user traffic within the cyber system based on the tabular representation to identify one or more anomalies within the cyber system; and
    generate at least one modification to the cyber system to restrict activity within the cyber system based on the identified anomalies and the modeling; and
    output the at least one modification.

14. The system of claim 13, wherein the system is connected to the associated cyber system.

15. The system of claim 13, wherein the cyber security feature is further configured to perform one or more graph walks between nodes of the tripartite user-host-application graph.

16. The system of claim 15, wherein at least one of the anomalies is based on the graph walks.

17. The system of claim 13, wherein the generating the modification is further based on specificity, coherence, or reachability scores for the anomalies.

18. The system of claim 13, wherein the multidimensional vector space comprises a 50-dimensional vector space, a 100-dimensional vector space, or a 200-dimensional vector space.

19. The system of claim 13, wherein:
    the tripartite user-host-application graph comprises multiple scales; and
    the cyber security feature is further configured to transform the tripartite user-host-application graph into the tabular representation by transforming the tripartite user-host-application model at each scale.

20. One or more non-transitory computer readable storage media that, when executed by one or more processors, causes the one or more processors to:
- model an associated cyber system as a heterogenous network of nodes using a tripartite user-host-application graph comprising a user-host sub-graph and a host-application sub-graph;
- transform the tripartite user-host-application graph into a tabular representation that preserves topological properties of the nodes, wherein each of the nodes from the tripartite user-host-application graph comprise a point in multidimensional vector space within the tabular representation;
- analyze user traffic within the cyber system based on the tabular representation to identify one or more anomalies within the cyber system; and
- generate at least one modification to the cyber system to restrict activity within the cyber system based on the identified anomalies and the modeling; and
- output the at least one modification.

* * * * *